July 12, 1927.
L. M. WOOLSON
MOTOR VEHICLE
Filed May 8, 1922
1,635,873
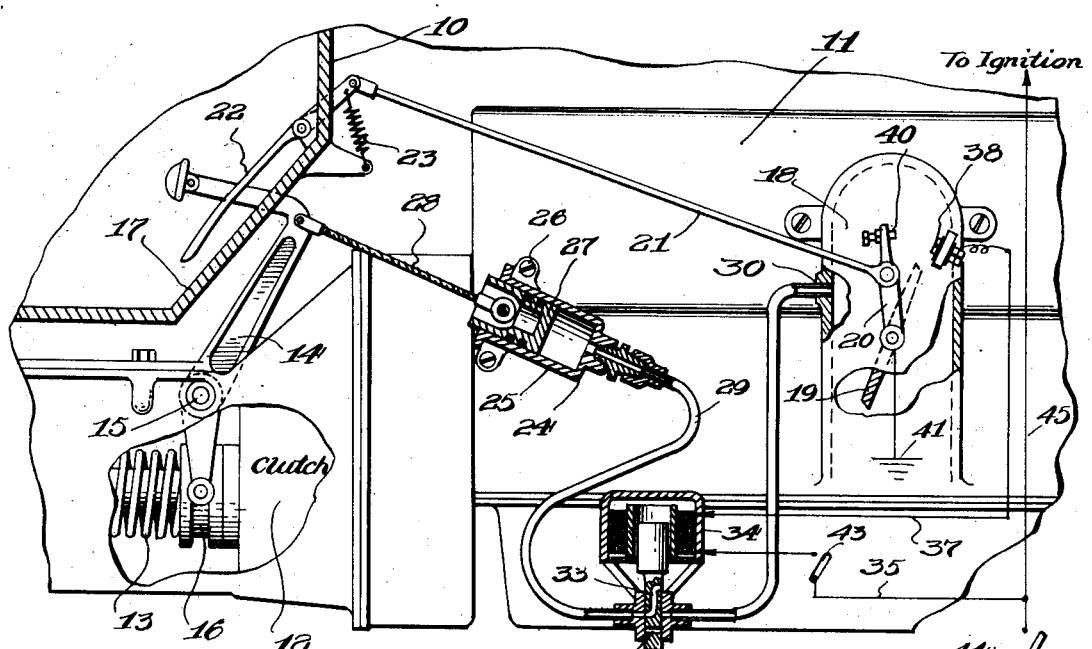
Fig.1
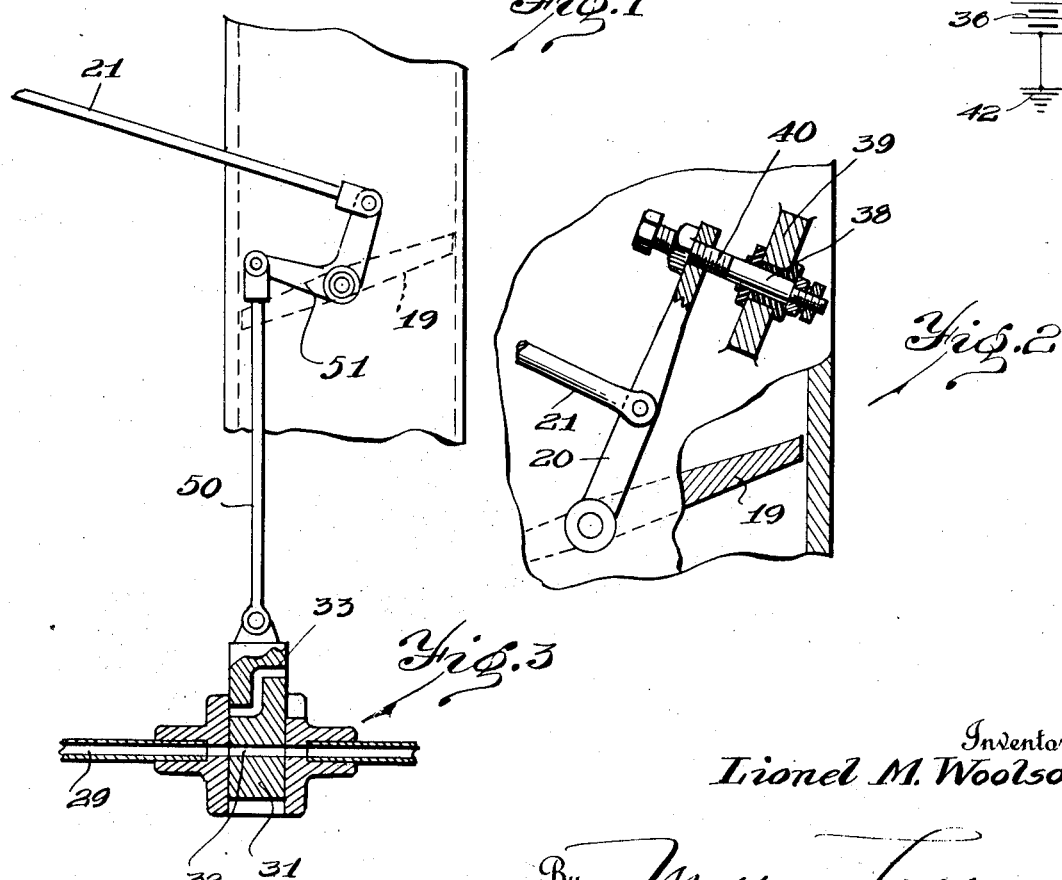
Fig.2
Fig.3
Inventor:
Lionel M. Woolson,
By Miller Sibbett,
Attorney.

Patented July 12, 1927.

1,635,873

UNITED STATES PATENT OFFICE.

LIONEL M. WOOLSON, OF DETROIT, MICHIGAN, ASSIGNOR TO PACKARD MOTOR CAR COMPANY, OF DETROIT, MICHIGAN, A CORPORATION OF MICHIGAN.

MOTOR VEHICLE.

Application filed May 8, 1922. Serial No. 559,447.

This invention relates to motor vehicles and particularly to the engine and clutch thereof.

In driving a motor vehicle the operator thereof is required to operate the clutch by his foot through a lever which acts against the spring of the clutch, and as the clutch has to be opened or disengaged from the motor whenever the gears are shifted it becomes something of a burden on the operator unless the clutch spring is very light or there is little gear shifting to be done. This burden has been lightened to some extent by the use of higher powered engine and by the designing of clutches which require very little movement against their springs to fully open them thus permitting of the use of greater leverage for the clutch pedal without unduly increasing the length of its stroke. But there is, of course, a limit to the size and power of the engine that can be used in a motor vehicle and rather close manufacturing limits are required in building a clutch with a short throw for disengaging the driving and driven plates or other surfaces, and one of the objects of the present invention is to provide a device which is operated by the motor and which automatically assists in releasing the clutch at a time when the full engagement of the clutch is not necessarily required. Thus the present invention provides a device which is connected to the clutch and which is operated by the motor only when the throttle valve thereof is substantially closed or when the motor is idling, and this device will under those conditions assist in operating the clutch and disengaging its contact surfaces. It then becomes very easy for the operator of the vehicle to throw the clutch out and as practically the only time when the clutch is to be disengaged is when the motor is on closed throttle this device is always ready to assist in throwing the clutch out and yet the full power of the clutch is exerted when the motor is operating under anything but its minimum power.

Other objects of the invention will appear from the following description taken in connection with the drawings, which form a part of this specification, and in which:

Fig. 1 is a side elevation of part of a motor vehicle showing the engine and clutch and other adjacent parts, embodying the invention;

Fig. 2 is an enlarged detail view of the engine throttle and an electrical contact; and Fig. 3 is a detail view showing another form of throttle connection.

Referring to the drawings 10 represents a motor vehicle upon which is mounted an internal combustion engine 11 and a clutch 12, the clutch being of any desired type for connecting the motor crank shaft with the transmission or gear box of the vehicle. The clutch is shown as having a spring 13 which normally engages the clutch friction parts, and a clutch lever or pedal 14 is pivotally mounted as at 15 and connected with a collar 16 for operating the clutch or moving it to its disengaged or open position, this movement taking place against the action of the spring 13. The upper end of the lever 14 extends through the inclined floor board 17 of the vehicle so that it may be engaged and operated with the foot. The internal combustion engine 11 is provided with an intake manifold or conduit 18 by which the mixture is fed to the engine, and a throttle valve 19 determines the quantity of mixture passing therethrough to the engine. An arm 20 on the throttle valve is connected by a rod 21 with a foot accelerator pedal 22 which is also mounted adjacent the inclined floor board 17 so that it may be moved by the operator to open and close the throttle. A spring 23 yieldingly retains the throttle in closed position and the throttle may be opened by depressing the pedal 22. It is shown in Fig. 1 in approximately wide open position. For assisting in operating the clutch 12, as hereinabove suggested, a device 24 is provided and is shown in the form of a cylinder 25 mounted on the engine or some other suitable support as by the screws 26, and a piston 27 operating in the cylinder and connected to the clutch lever 14 as by a cable 28. The head end of the cylinder 25 is connected to the engine by a pipe 29 which extends to the intake conduit 18 above the throttle valve, entering the conduit at 30. In this pipe 29 is a valve 31 which may be moved to either of two positions, the valve having a through opening 32 and a relief opening 33, the latter opening being shown connected to the pipe 29 in Fig. 1 so that the interior of the cylinder 25 is open to the atmosphere. In this position the piston 27 has no effect whatever upon the clutch 12 and its spring 13 is fully operative. With the opening 32 in position to connect the two parts of the pipe 29 the interior of the cylinder 25 would be in direct communication with the interior of the intake conduit 18 and, with the throttle valve 19 in substantially closed position, there would be a high suction in the intake conduit (presuming that the motor is running) and this suction would act upon the piston 27 which in turn would tend to operate the lever 14 and act in opposition to the expanding action of the spring 13. Of course if the suction were great enough or if the surface of the piston 27 was large enough, the clutch spring would be entirely overcome, but in the preferred form of the invention the action is such that the clutch spring would still operate sufficiently to transmit the light power of the motor at substantially closed throttle.

Means are provided for operating the valve 31 either indirectly through an electric solenoid and connections, or directly through mechanical connections. In Fig. 1 the valve 31 is shown as operated by a solenoid 34 connected through a wire 35 with one side of a battery 36 and through a wire 37 with a contact point 38 mounted adjacent the throttle valve arm 20 on the engine. In Fig. 2 this contact 38 is shown as insulated from a lug 39 by which it is supported. When the throttle 19 is closed a contact 40 mounted on the arm 20 is brought down against the contact 38 and since the arm 20 is grounded on the engine, shown diagrammatically at 41, and the other side of the battery is grounded as shown at 42, a complete circuit is made through the solenoid winding when the switches 43 and 44 are closed, these switches being preferably mounted on the dash of the vehicle in a convenient position for the operator. Another wire 45 runs from the switch 44 to the engine ignition as indicated in Fig. 1 and with the switch 44 closed and the switch 43 open the engine may be operated and the automatic operation of the device 24 eliminated.

Under these conditions the engine may be used as a brake with the clutch in, as may be desirable on a heavy down grade.

From the above description it will be seen that with the throttle valve open as shown in Fig. 1 and the contacts 38 and 40 consequently separated, the solenoid 34 will be inactive and the valve 31 will be in the position shown whereby the device 24 is inactive, being disconnected from the intake conduit of the engine. When the throttle valve 19 is closed the contacts 38 and 40 will meet and the solenoid circuit will be closed and the valve 31 raised so that its opening 32 connects the two parts of the pipe 29. The suction of the intake conduit 18 is then communicating to the cylinder 25 and the piston 27 is under the influence of the suction and attempts to pull the clutch lever 14 towards the right. As the suction is not quite enough to release the clutch the latter remains in clutching position but may be released by the operator by a very slight pressure on the pedal. Opening the throttle valve again renders the device 24 inactive and the clutch acts with its normal functions.

In Fig. 3 the pipe 29 and valve 31 are shown with a direct connection from the valve to the throttle valve 19. A rod 50 runs from the valve 31 to an arm 51 on the throttle valve 19 so that when the throttle valve is open the passage 33 of the valve 31 will communicate with the pipe 29, and when the throttle valve 19 is closed as shown in Fig. 3, the opening 32 will connect the two parts of the pipe 29 and the device 24 will be operated by the suction in the engine intake conduit as above described.

It will be understood that various forms of the invention other than those described above may be used without departing from the spirit or scope of the invention.

Having thus described my invention, what I claim and desire to secure by Letters Patent is:

1. In a motor vehicle, the combination with a motor and a clutch, of means for manually operating the clutch, and means operated by the motor tending but not sufficient to operate the clutch.

2. In a motor vehicle, the combination with a motor and a clutch, of means operated by the motor tending but not sufficient to operate the clutch.

3. In a motor vehicle, the combination with a motor and a clutch, of means connected to the motor tending but not sufficient to operate the clutch.

4. In a motor and clutch combination, a spring closed clutch, a manually controlled lever for opening the clutch, and means operated by the motor and connected to said lever tending but not sufficient to effect said opening of the clutch.

5. The combination with an internal combustion engine and a clutch, of a device operated by the engine and connected to assist in effecting a release of the clutch without being sufficient to effect such release.

6. In a motor vehicle, in combination, an engine, a spring closed clutch, and a device under the control of the throttle valve of the engine tending but not sufficient to effect opening of the clutch.

7. In a mechanism of the class described, in combination, an internal combustion engine having an intake conduit and a throttle valve therein, a clutch having a spring for closing it, means connected to only partially oppose the closing action of said spring, said means being connected to said engine and adapted to operate only when the throttle valve thereof is substantially closed, and means for manually opening said clutch.

8. In a mechanism of the class described, in combination, an internal combustion engine having an intake conduit and a throttle valve therein, a clutch having a spring for closing it, and means connected to only partially oppose the closing action of said spring, said means being connected to said engine and having a device for bringing it into or throwing it out of operation, and connections from said device to the engine throttle valve for determining the position of said device.

9. In a motor vehicle, the combination with the engine and the spring closed clutch thereof, of means operated by the engine to only partially counteract the clutch spring when the power transmitted through the clutch is low.

10. In a motor vehicle, the combination with the engine, the clutch, and a spring to hold said clutch in power transmitting engagement, of manual means to counteract the clutch spring and disengage the clutch, and suction means operated by the engine to only partially counteract the clutch spring when the power transmitted is low.

11. The combination with an internal combustion engine and a spring closed power transmitting clutch therefor, of manual means to open said clutch, and suction means operated by the engine to assist said manual operating means when the transmitted power is low, said suction means at most being less than sufficient to open said clutch.

In testimony whereof I affix my signature.

LIONEL M. WOOLSON.